United States Patent
Kusuura

(10) Patent No.: US 9,409,318 B2
(45) Date of Patent: Aug. 9, 2016

(54) METHODS AND SYSTEMS FOR COLLECTING THERMOPLASTIC RESINS

(75) Inventor: Takahisa Kusuura, Kawasaki (JP)

(73) Assignee: Empire Technology Development LLC, Wilmington, DE (US)

( * ) Notice: Subject to any disclaimer, the term of this patent is extended or adjusted under 35 U.S.C. 154(b) by 398 days.

(21) Appl. No.: 13/640,781

(22) PCT Filed: Apr. 23, 2012

(86) PCT No.: PCT/JP2012/002782
§ 371 (c)(1),
(2), (4) Date: Oct. 12, 2012

(87) PCT Pub. No.: WO2013/160931
PCT Pub. Date: Oct. 31, 2013

(65) Prior Publication Data
US 2013/0280365 A1    Oct. 24, 2013

(51) Int. Cl.
 *B29C 39/42*  (2006.01)
 *B29B 17/02*  (2006.01)

(52) U.S. Cl.
 CPC .......... *B29B 17/02* (2013.01); *B29B 2017/0203* (2013.01); *B29B 2017/0255* (2013.01); *Y02W 30/622* (2015.05)

(58) Field of Classification Search
 CPC ............ B29B 17/02; B29B 2017/0203; B29B 2017/0255; Y02W 30/622
 USPC ........................................................ 425/447
 See application file for complete search history.

(56) References Cited

U.S. PATENT DOCUMENTS

| | | |
|---|---|---|
| 5,549,250 A | 8/1996 | Stricker |
| 5,590,789 A | 1/1997 | Stricker et al. |
| 2009/0120579 A1 | 5/2009 | Miyasaka et al. |
| 2010/0189985 A1 | 7/2010 | Satsuka et al. |
| 2010/0243772 A1* | 9/2010 | Kojima et al. ............ 241/24.11 |

FOREIGN PATENT DOCUMENTS

| | | |
|---|---|---|
| CN | 101434112 A | 5/2009 |
| CN | 101541497 A | 9/2009 |
| EP | 2039485 A1 | 3/2009 |
| EP | 2060330 A2 | 5/2009 |
| GB | 2240731 A | 8/1991 |
| JP | S49132868 A | 12/1974 |
| JP | 2515302 B2 | 7/1996 |
| JP | 2002-046128 A | 2/2002 |
| JP | 2009-013277 A | 1/2009 |
| JP | 2009-137273 A | 6/2009 |

(Continued)

OTHER PUBLICATIONS

International Search Report and Written Opinion for PCT/JP2012/002782, dated Jul. 31, 2012.

(Continued)

*Primary Examiner* — Robert J Grun
(74) *Attorney, Agent, or Firm* — Pepper Hamilton LLP

(57) ABSTRACT

Systems for collecting a thermoplastic resin that includes a heating mechanism configured to apply heat to the thermoplastic resin so as to control a viscoelasticity thereof, a pressurization mechanism configured to apply a pressure difference to a surface of the thermoplastic resin, and a trapping structure configured to trap a portion of the thermoplastic resin are described.

30 Claims, 8 Drawing Sheets

(56) References Cited

FOREIGN PATENT DOCUMENTS

| | | |
|---|---|---|
| WO | 2003090941 A1 | 11/2003 |
| WO | WO2008136165 A1 | 11/2008 |

OTHER PUBLICATIONS

Kuzwanti, An Engineering Approach to Plastic Recycling Based on Rheological Characterization, *Journal of Industrial Ecology* (Feb. 8, 2008), 6(3-4):125-135 (Abstract).

Nishimura Metal Machining Holes, http://www.nsmr.jp/blog/bisai/46 (Machine Translated, Printed from Internet Sep. 27, 2012).

Ceramic coating of the ITF: DLC Coating, http://nippon-itf.co.jp/products/dlc/html (Machine Translated, Printed from Internet Aug. 21, 2012).

DLC Coatings, (Printed from Internet Aug. 21, 2012 http://www.diamonex.com/products/dlc-coatings/?gclid=CNay9_nLnqgCFQ_ybwodAV4RHg.

DLC (Diamond-like carbon), http://www.nissin.pvd.com/en/content/181 (Printed from Internet Aug. 21, 2012).

Infrared heating, http://www.iwasaki.co.jp/chishiki/ir/31.html (Machine Translated, Printed from Internet Aug. 21, 2012.

Sonar Rubber Tire, http://www.sonartire.com/index.php?fn=knowledge (Printed from Internet Aug. 21, 2012).

Transmission belt, http://www.tohogomu.co.jp/products/non_asbestos/belt/index_2.html (Machine Translated, Printed from Internet Aug. 21, 2012).

Cogged V-Belt, http://www.asia.ru/en/ProductInfo/966301/html (Printed from Internet Aug. 21, 2012).

Air jet nozzle, http://www.cstechkk.co.jp/?cat=29 (Machine Translated, Printed from Internet Aug. 21, 2012).

Adjustable Wind Jet Nozzle, http://www.i-spraynozzle.com/en/Adjustable-Wind-jet-nozzle-189.html (Printed from Internet Aug. 21, 2012).

Izumi Co., Ltd. Sun, Nissen spring day to propose an environmental and energy-saving equipment, http://www.riquan.co.jp/index.php (Machine Translated, Printed from Internet Aug. 21, 2012).

Overview conveyor sieve "Yureru VC" Vibration, http://www.tokyoshiesetsu.co.jp/results/index/html (Machine Translated, Printed from Internet Aug. 21, 2012).

Measurement Examples of Dynamic Viscoelasticity of ABS Resin, accessed at https://web.archive.org/web/20110806233416/http://www.umgabs.co.jp/jp/qanda/p08_tand.htm, accessed Jan. 14, 2015, p. 1.

SMC type crusher, accessed at https://web.archive.org/web/20100828152625/http://www.riquan.co.jp/ns/?page_id=1165, accessed on Dec. 22, 2014, pp. 1-3.

While enjoying a pilot series of sports performance, nor the driver you want to find a comfortable ride, accessed at https://web.archive.org/web/20120110124029/http://store.michelin.co.jp/shop/g/g032000_srd/, accessed on Dec. 23, 2014, pp. 1-3.

The paper machine press roll vibration control device, accessed at http://j.tokkyoj.com/data/D21F/2515302.shtml, issued Oct. 30, 1996. See English abstract of JP2515302B2.

* cited by examiner

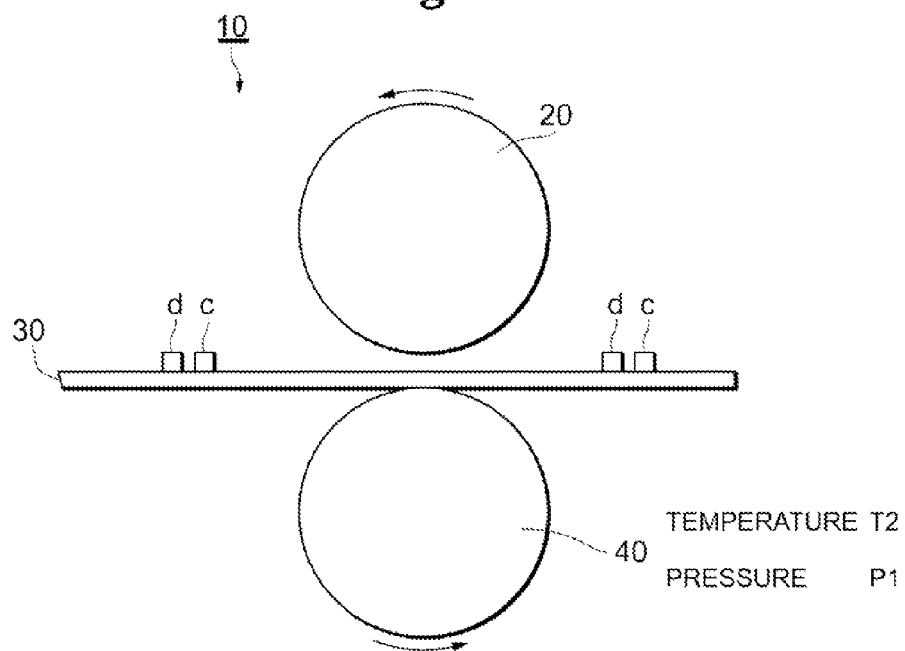
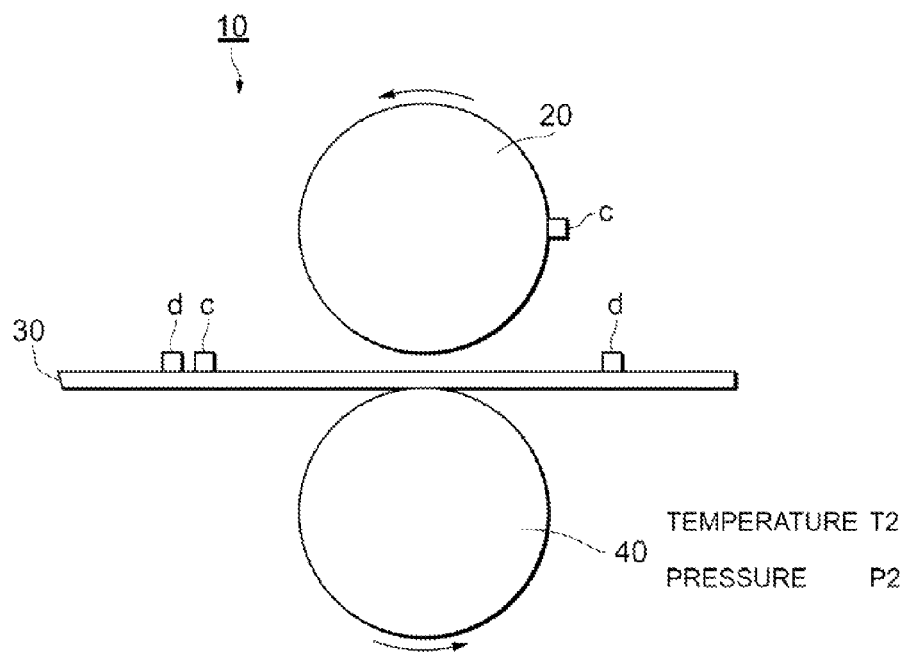

METHODS AND SYSTEMS FOR COLLECTING THERMOPLASTIC RESINS

CROSS-REFERENCE TO RELATED APPLICATIONS

This application is a U.S. national stage filing under 35 U.S.C. §371 of International Application No. PCT/JP2012/002782, filed on Apr. 23, 2012, entitled "Methods and Systems for Collecting Thermoplastic Resins," the disclosure of which is incorporated by reference in its entirety.

TECHNICAL FIELD

The present disclosure relates to methods and systems for collecting thermoplastic resins.

BACKGROUND

Highly functional thermoplastic resins whose use and variety are expected to further increase in the future, with the widespread use of durable consumer goods, are required to be finely collected in accordance with their resistance and moldability and supplied for recycling as thermoplastic resins of higher quality. The use of highly functional thermoplastic resins is increasing, particularly in household appliances and automobiles. In particular, when talking about the highly functional thermoplastic resins used in optical components and high-strength members, the manufacturing processes are complicated and the raw materials are expensive; therefore, it is preferable that highly functional thermoplastic resins can be recycled at a quality level closer to that of the original products.

Typically employed current methods of collecting thermoplastic resins by specific gravity and/or charging characteristics, although they may be simple, are not suitable for finely collecting highly functional thermoplastic resins. For example, because the heat resistance and moldability required for many highly functional thermoplastic resins differ depending on their usage (television sets, automobiles, etc.), various adjustments are made for each usage, including changing the molecular weight, mixing polymers having different molecular weights, copolymerizing various monomers, and adding functional groups, and in some cases, different polymers are mixed and polymer alloys are formed. Through such adjustments, thermoplastic resins having a great variety of characteristics can be formed from a limited number of organic compounds (monomers) as required. These adjustments, however, do not result in mutual differences in specific gravity and charging characteristics among highly functional thermoplastic resins; thus, it is difficult to collect them by their specific gravity and/or charging characteristics.

In addition, when an adjustment is carried out based on molecular weight, collecting becomes impossible even if spectral analysis, such as infrared analysis, is conducted. For copolymers, mixtures of polymers, and polymer alloys, identification by spectral analysis is possible to a certain extent, but it is virtually impossible to accurately identify and collect large amounts of the various thermoplastic resins contained in different percentages in a thermoplastic resin mixture.

To carry out recycling at a quality level closer to that of the original products, it is necessary to collect the thermoplastic resins more finely. Specifically, the thermoplastic resins must be collected based not only on their material name (e.g., ABS, cycloolefin, polyimide, etc.) but also on their molecular weight and properties, e.g., heat resistance or moldability. Heat resistance is determined by the use of the material, and moldability is determined by the requirement of the product. Low moldability causes defects in the product and greatly affects product quality.

With the thermoplastic resin, heat resistance is directly affected by the softening point, which is represented by Tg (glass-transition point), and moldability is affected by the storage elastic modulus in the temperature range from the glass-transition point to the melting point (rubber elasticity range). Such properties are generally referred to as rheological characteristics (dynamic viscoelasticity) as a whole. Some thermoplastic resins have similar backbones and thus have substantially the same Tg but exhibit different properties in their rubber elasticity range (e.g., different storage elastic modulus, etc.). Since such thermoplastic resins are mainly adjusted to improve their moldability, it is preferable to separate such thermoplastic resins and to reuse recycled thermoplastic resins produced from such thermoplastic resins in products similar to the products the thermoplastic resins were originally used in.

BRIEF DESCRIPTION OF DRAWINGS

FIG. 8 shows a schematic view of a system for collecting a thermoplastic resin in accordance with an embodiment of the present disclosure.

FIG. 9 shows a schematic view of a system for collecting a thermoplastic resin in accordance with an embodiment of the present disclosure.

DETAILED DESCRIPTION

Figure 1:
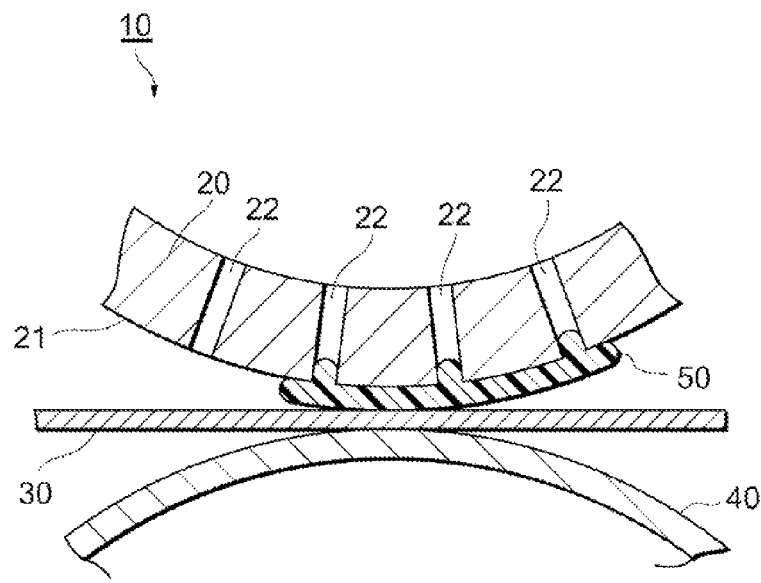
FIG. 1 shows a partial cross-sectional view of a system for collecting a thermoplastic resin in accordance with an embodiment of the present disclosure.

The present disclosure takes advantage of the fact that thermoplastic resins have unique rheological characteristics, and that thermoplastic resins can be collected based on differences in their rheological characteristics in a range between a softening point and a melting point (rubber elastic region). Since the storage elastic modulus in the rubber elastic region is proportional to the force required for deformation, the storage elastic modulus can be measured by determining the extent of deformation of a thermoplastic resin under a certain pressure at a certain temperature. In determining the extent of deformation of the thermoplastic resin, a certain pressure difference may be applied to a surface of the thermoplastic resin at the certain temperature.

The certain pressure difference may be applied to the surface of the thermoplastic resin, for example by applying positive pressure higher than atmospheric pressure to a certain area of the surface of the thermoplastic resin while applying atmospheric pressure to an area other than the certain area of the surface of the thermoplastic resin, or, for example, by applying negative pressure lower than atmospheric pressure to a certain area of the surface of the thermoplastic resin while applying atmospheric pressure to an area other than the certain area of the surface of the thermoplastic resin, or for example by applying positive pressure higher than atmospheric pressure to a certain area of the surface of the thermoplastic resin while applying negative pressure lower than atmospheric pressure to an area other than the certain area of the surface of the thermoplastic resin.

This way, a thermoplastic resin having a rheological characteristic falling within a certain range deforms under the certain pressure difference at the certain temperature, whereas a thermoplastic resin having a rheological characteristic falling outside the certain range does not deform under the certain pressure difference at the certain temperature. Thermoplastic resin collecting can be conducted based on rheological characteristics.

According to the present disclosure, even thermoplastic resins that have similar specific gravity and charging characteristics because of their similar backbones can be finely collected on the basis of their rheological characteristics and, moreover, a group of thermoplastic resins having similar heat resistance properties can be collected even more finely on the basis of rheological characteristics. Thus, thermoplastic resins that have conventionally been difficult to collect by specific gravity and/or charging characteristics, such as copolymers having different molecular weights or contained in different proportions and blended polymers and polymer alloys having different mixing proportions, can be finely collected, and recycled resins with uniform quality that can be readily reused in products similar to the original products can be provided.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a partial cross-sectional view of a system 10 for collecting a thermoplastic resin 50 in accordance with an embodiment of the present disclosure. The system 10 may be provided with a hollow mold 20, a conveyor belt 30, and a pressure roller 40. The hollow mold 20 and the pressure roller 40 may oppose each other on either side of the conveyor belt 30. The thermoplastic resin 50 may be conveyed through between the hollow mold 20 and the pressure roller 40 by the conveyor belt 30. The hollow mold 20 may be provided with at least one hole 22 arranged on a surface 21 thereof to trap a portion of the thermoplastic resin 50. The at least one hole 22 may penetrate between the inside and outside of the hollow mold 20. The size of the at least one hole 22 may be approximately several tenths of the size of the thermoplastic resin 50. The surface 21 of the hollow mold 20 except for the at least one hole 22 may be coated with a low-surface-energy coating.

The pressure roller 40 may be configured to apply uniform pressure to the thermoplastic resin 50. When pressing the hollow mold 20 against the thermoplastic resin 50, the system 10 may apply positive pressure higher than atmospheric pressure to a contact area between the thermoplastic resin 50 and the hollow mold 20 while applying atmospheric pressure to a non-contact area between the thermoplastic resin 50 and the hollow mold 20 through the at least one hole 22. In this way, a certain pressure difference can be applied to the surface of the thermoplastic resin 50.

As shown in FIG. 1, when pressing the hollow mold 20 against the thermoplastic resin 50 while applying heat to the thermoplastic resin 50 so as to control a viscoelasticity thereof, the thermoplastic resin 50 having a rheological characteristic falling within a certain range deforms and then a part of the thermoplastic resin 50 enters the at least one hole 22. This way, the thermoplastic resin 50 having the rheological characteristic falling within the certain range is trapped by the hollow mold 20. In this context, the hollow mold 20 serves as a trapping structure configured to trap a portion of the thermoplastic resin 50.

Figure 2:
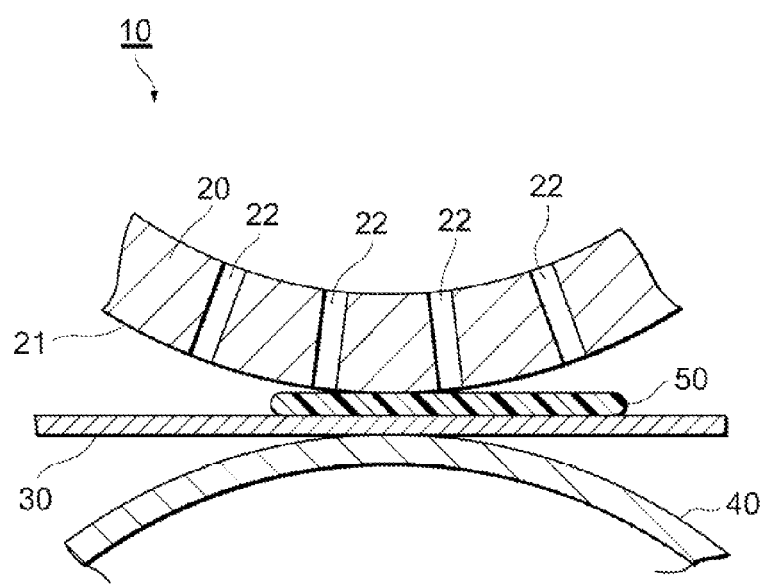
FIG. 2 shows a partial cross-sectional view of a system for collecting a thermoplastic resin in accordance with an embodiment of the present disclosure.

In contrast, as shown in FIG. 2, when pressing the hollow mold 20 against the thermoplastic resin 50 while applying heat to the thermoplastic resin 50 so as to control a viscoelasticity thereof, the thermoplastic resin 50 having a rheological characteristic falling outside the certain range does not deform and also a part of the thermoplastic resin 50 does not enter the at least one hole 22. As a result, the thermoplastic resin 50 having the rheological characteristic falling outside the certain range is not trapped by the hollow mold 20.

Figure 3:
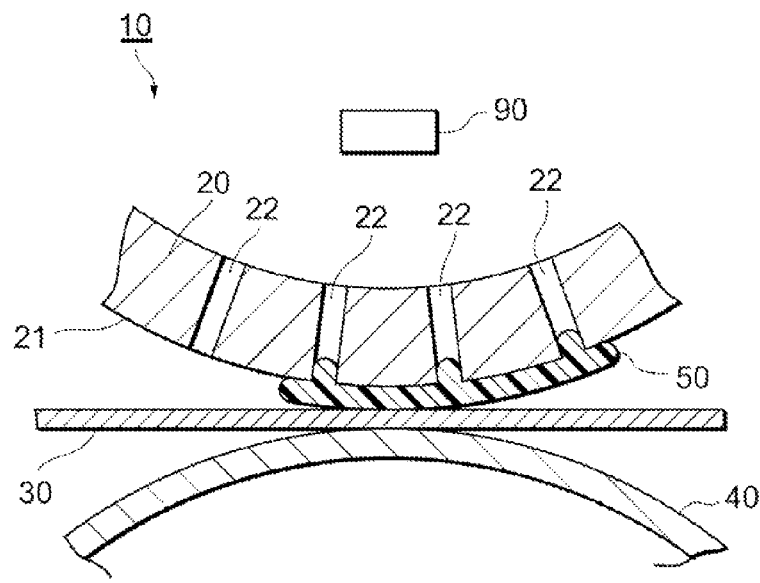
FIG. 3 shows a partial cross-sectional view of a system for collecting a thermoplastic resin in accordance with an embodiment of the present disclosure.

Alternatively, as shown in FIG. 3, the system 10 may be provided with a vacuum suction unit 90. When pressing the hollow mold 20 against the thermoplastic resin 50, the system 10 may apply negative pressure lower than atmospheric pressure to the non-contact area between the thermoplastic resin 50 and the hollow mold 20 through the at least one hole 22 by using the vacuum suction unit 90 while applying a predetermined pressure required to seal the contact area between the thermoplastic resin 50 and the hollow mold 20. In this way, a certain pressure difference can be applied to the surface of the thermoplastic resin 50. Thermoplastic resin collecting can be conducted based on rheological characteristics, on the same principle as that previously explained.

Figure 4:
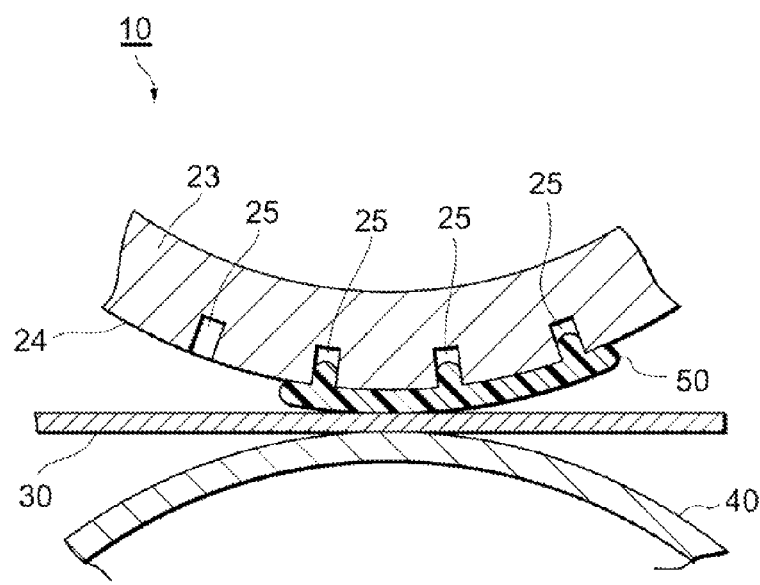
FIG. 4 shows a partial cross-sectional view of a system for collecting a thermoplastic resin in accordance with an embodiment of the present disclosure.

Alternatively, as shown in FIG. 4, the system 10 may use a mold 23 instead of the hollow mold 20. The mold 23 may be provided with at least one recess 25 arranged on a surface 24 thereof to trap a portion of the thermoplastic resin 50. The size of the recess 25 may be approximately several tenths of the size of the thermoplastic resin 50. The surface 24 of the mold 23 except for the at least one recess 25 may be coated with a low-surface-energy coating. The mold 23 may be configured to press a surface of the thermoplastic resin 50. When pressing the mold 23 against the thermoplastic resin 50, the system 10 applies positive pressure higher than atmospheric pressure to a contact area between the thermoplastic resin 50 and the mold 23 while applying atmospheric pressure to a non-contact area between the thermoplastic resin 50 and the hollow mold 23 via the recess 25. In this way, a certain pressure difference can be applied to the surface of the thermoplastic resin 50. Thermoplastic resin collecting can be conducted based on rheological characteristics, on the same principle as that previously explained. Similar to the hollow mold 20, the mold 23 serves as a trapping structure configured to trap a portion of the thermoplastic resin 50.

In one non-limiting aspect of the present disclosure, the heat and the pressure difference may be applied to a plurality of thermoplastic resins 50, at least one of which is to be trapped. An amount of the applied heat may be selected based on a softening point of the thermoplastic resin 50 to be trapped. Also, an amount of the applied pressure difference may be selected based on a required pressure at which the thermoplastic resin 50 to be trapped is distorted.

The thermoplastic resin 50 may include, but is not limited to, vinyl chloride, polypropylene, polyethylene, polycarbonate, nylon, acrylonitrile butadiene styrene, acrylic, polystyrene, polyimide, polyamide, polyvinyl acetate, polybutylene terephthalate, polyethylene terephthalate, polyethersulfone, polysulfone, polyphenylene sulfide, acrylonitrile-styrene-acrylate copolymer, ethylene-vinyl acetate copolymer, acrylonitrile-styrene copolymer, acrylonitrile-acrylate-styrene copolymer, acrylonitrile-ethylene-styrene copolymer, acrylonitrile-chlorinated polyethylenestyrene copolymer, ethylene vinylalcohol copolymer, methyl methacrylatebutadiene-styrene copolymer, styrene-butadiene-styrene block copolymer, styrene-ethylene-propylene-styrene block copolymer, styrene-isoprene-styrene block copolymer, styrene-ethylene-butylene-styrene block copolymer, and ethylenepropylene-diene ternary copolymer.

Figure 5:
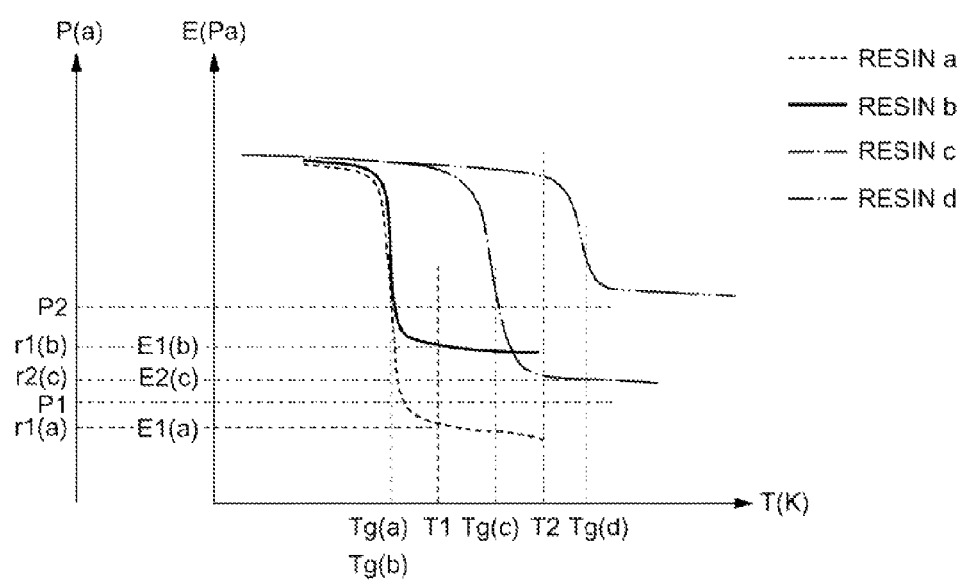
FIG. 5 shows rheological characteristics of different thermoplastic resins.

Referring to FIGS. 5-9, the principle of the thermoplastic resin collecting based on rheological characteristics will be explained in more detail. FIG. 5 shows rheological characteristics of different thermoplastic resins a, b, c, and d. The horizontal axis and vertical axis thereof represent temperature and pressure, respectively. The process carried out in the system 10 according to the present disclosure focuses on the fact that the thermoplastic resins a, b, c, and d have unique rheological characteristics. For example, when collecting of the thermoplastic resins a, b, c, and d, having such rheological characteristics as shown in FIG. 5, is considered, they can be collected through the following processes.

Figure 6:
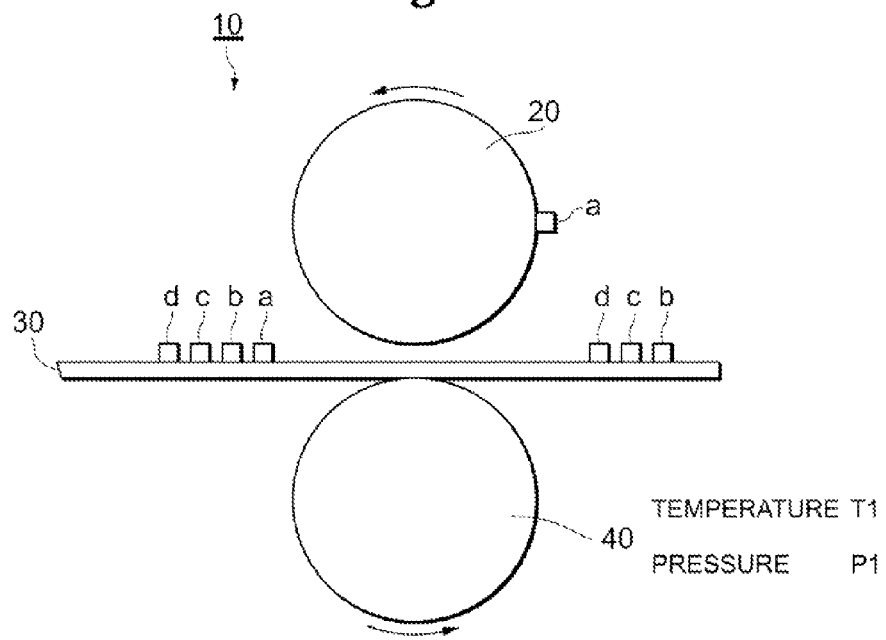
FIG. 6 shows a schematic view of a system for collecting a thermoplastic resin in accordance with an embodiment of the present disclosure.

First, as shown in FIG. 6, the temperature may be set to T1, which is higher than Tg of the thermoplastic resins a and b and lower than Tg of the thermoplastic resins c and d (Tg(a)=Tg(b)<T1<Tg(c)<Tg(d)). Here, Tg(a), Tg(b), Tg(c), and Tg(d) denote the Tg of the thermoplastic resins a, b, c, and d, respectively. At temperature T1, only the thermoplastic resins a and b enter a rubber elasticity state, and their storage elastic moduli are approximately one thousandth the size of that when the temperature is Tg or lower. Therefore, only in the thermoplastic resins a and b, may the surface deform when the hollow mold 20 is pressed against the thermoplastic resins a, b, c, and d at temperature T1.

The pressure to be applied to the pressure roller 40 may be controlled and set to P1 (r1(a)<P1<r1(b)), which is larger than r1(a) (=(storage elastic modulus E1(a) of the thermoplastic resin a at temperature T1)/(required strain fm)) and smaller than r1(b) (=(storage elastic modulus E1(b) of the resin b at temperature T1)/(required strain fm)), where fm represents the minimum strain required for a part of the thermoplastic resin to enter the at least one hole 22 and attach to the surface 21 of the hollow mold 20. The value can be determined by processing a thermoplastic resin with known properties with the same mold. The storage elastic modulus E2 of the thermoplastic resin b is larger than E1 (E1<E2), and P1<r1(b) (=(storage elastic modulus E2 of the thermoplastic resin b at temperature T1)/(required strain fm)). Therefore, even when the thermoplastic resin b contacts the hollow mold 20 at pressure P1, sufficient deformation does not occur on the surface of the thermoplastic resin b. As a result, only the thermoplastic resin a is trapped by the hollow mold 20, and thus the thermoplastic resin a can be separated from the remaining thermoplastic resins b, c, and d.

Figure 7:
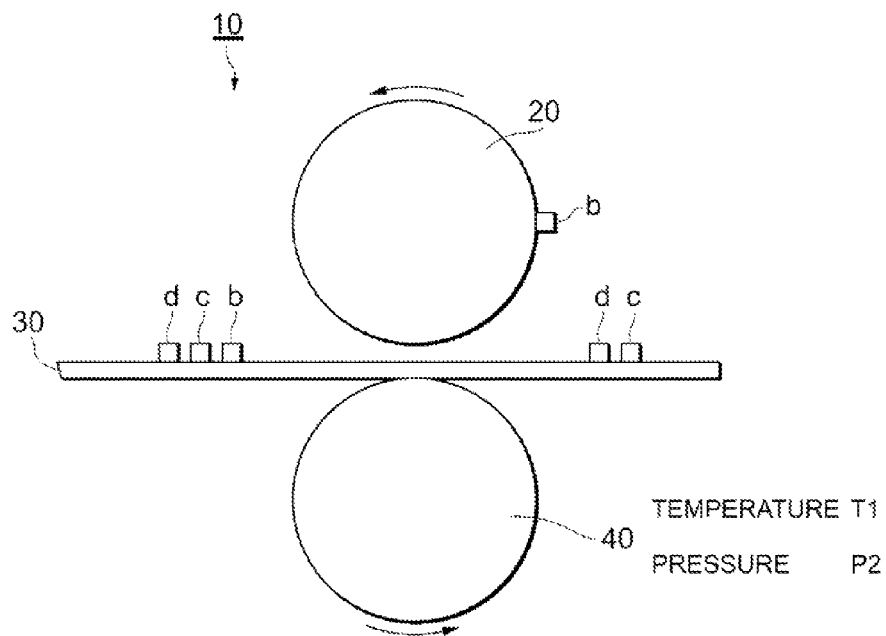
FIG. 7 shows a schematic view of a system for collecting a thermoplastic resin in accordance with an embodiment of the present disclosure.

Next, as shown in FIG. 7, while maintaining the temperature at T1, the pressure may be raised to P2, which is larger than r1(b) (=(storage elastic modulus E1(b) of the thermoplastic resin b at temperature T1)/(required strain fm), and the same process is repeated. Among the remaining group of thermoplastic resins b, c, and d, only the thermoplastic resin b sufficiently deforms and is trapped by the hollow mold 20 under this condition. In this way, it is possible to separate only the thermoplastic resin b from the remaining thermoplastic resins c and d.

For example, as shown in FIG. 8, the temperature may be raised to temperature T2, which is a value between Tg(c) of the thermoplastic resin c and Tg(d) of the thermoplastic resin d, and the pressure is set to P1. At the temperature T2, the thermoplastic resin c is in a rubber elasticity state, but the r2(c) (=(storage elastic modulus E2(c) of the thermoplastic resin c at temperature T2)/(required strain fm)) is larger than P1 (P1<r2(c)). Therefore, the surface of the thermoplastic resin c does not deform, and thus, the thermoplastic resin piece c is not trapped by the hollow mold 20.

As shown in FIG. 9, as a result of further raising the pressure to P2 and carrying out the same process, r2(c) is set smaller than P2 (r2(c)<P2). Therefore, the thermoplastic resin c sufficiently deforms and is trapped by the hollow mold 20. This way, thermoplastic resin c can be separated from the remaining thermoplastic resin d. By repeatedly changing the temperature and pressure through such processes, for example by successively raising the temperature and pressure from low to high, different thermoplastic resins a, b, c, and d can be finely collected by their rheological characteristics.

The process is summarized below. First, the temperature is set. Then, while maintaining the temperature, the pressure is varied in sequential steps. Finally, thermoplastic resins having rheological characteristics within a predetermined range are separated and collected. For example, the temperatures of the heated thermoplastic resins a, b, c, and d may be about 35 degrees Celsius to about 200 degrees Celsius. The applied pressure difference may be about 0.01 MPa to about 10 MPa. For example, if one of the thermoplastic resins a, b, c, and d is an ABS resin, whose glass-transition point is from about 96 degrees Celsius to about 105 degrees Celsius and whose storage elastic modulus is about 5 MPa at 130 degrees Celsius, the pressure difference applied to the ABS resin may be from about 1 MPa to about 10 MPa at 130 degrees Celsius. Also, if one of the thermoplastic resins a, b, c, and d is a cycloolefin copolymer resin, whose glass-transition point is about 135 degrees Celsius and whose storage elastic modulus is about 0.13 MPa at 170 degrees Celsius, the pressure difference applied to the cycloolefin copolymer resin may be from about 0.05 MPa to about 0.5 MPa at 170 degrees Celsius.

TABLE 1

| Temperature | Pressure | Resins in mixture | Separated resin | Remianing resins |
|---|---|---|---|---|
| T1 | P1 | a, b, c, d | a | b, c, d |
| T1 | P2 | b, c, d | b | c, d |
| T2 | P1 | c, d | Non | c, d |
| T2 | P2 | c, d | c | d |

By repeating the above explained processes, the purity of thermoplastic resins trapped by the hollow mold 20 can be increased by repeating the processes several times at the same temperature and pressure.

Figure 10:
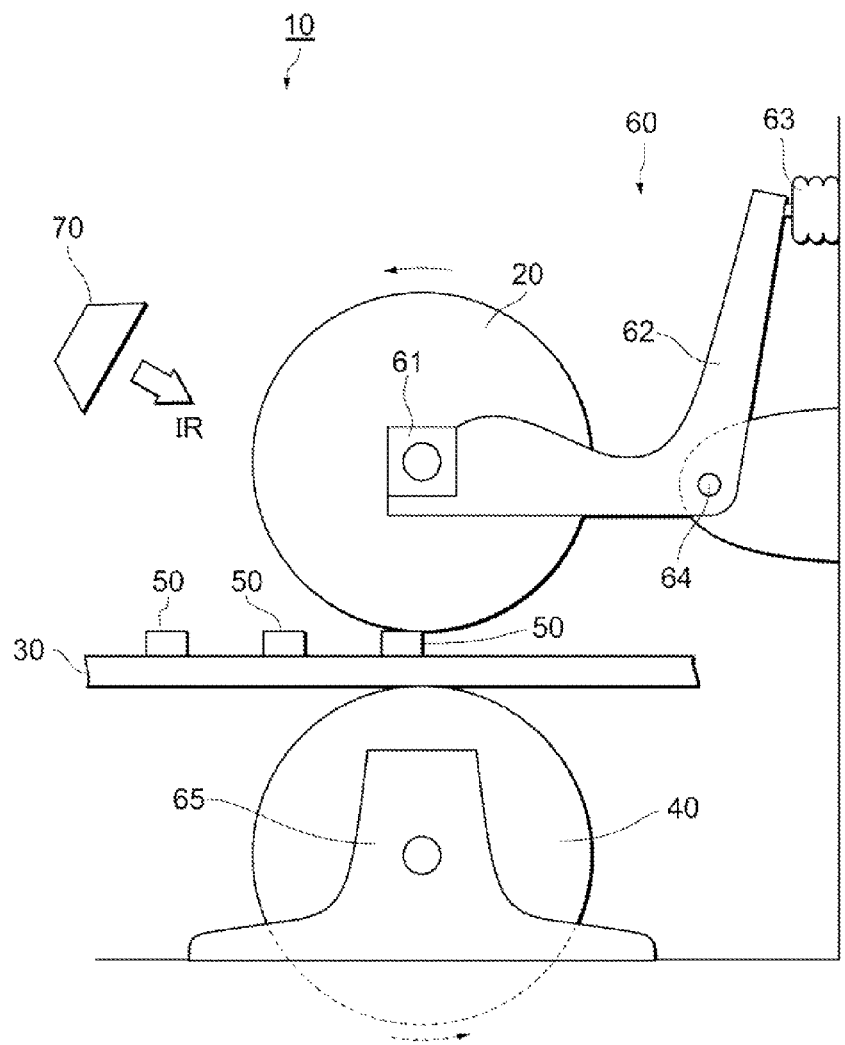
FIG. 10 shows a schematic view of a system for collecting a thermoplastic resin in accordance with an embodiment of the present disclosure.

FIG. 10 shows a schematic view of the system 10 in accordance with one aspect of the present disclosure. In addition to the structure illustrated in FIG. 1, the system 10 may be provided with a pressurization mechanism 60 and a heating mechanism 70. The pressurization mechanism 60 may be configured to apply pressure difference to the surface of the thermoplastic resin 50. Specifically, as shown in FIG. 10, the pressurization mechanism 60 may be provided with an arm 62 and a pressure generating device 63. The hollow mold 20 may be provided with a bearing housing 61 to allow the hollow mold 20 to rotate. The hollow mold 20 may be a roller-shaped mold. Likewise, the pressure roller 40 may be provided with a bearing housing 65 to allow the pressure roller 40 to rotate. A first end of the arm 62 is connected to the bearing housing 61, with respect to which the hollow mold 20 is rotatable. When a force is applied to a second end of the arm 62 by the pressure generating device 63, the arm 62 rotates with respect to a fulcrum point 64, and then the bearing housing 61 connected to the first end of the arm 62 moves toward the pressure roller 40. This way, the thermoplastic resin 50 between the hollow mold 20 and the pressure roller 40 is pressed by the hollow mold 20.

The structure of the pressurization mechanism 60 is not limited to the structure illustrated in FIG. 10. For example, the pressurization mechanism 60 may be configured to press the pressure roller 40 against the thermoplastic resin 50. Alternatively, the pressurization mechanism 60 may be provided with the vacuum suction unit 90 as illustrated in FIG. 3.

The heating mechanism 70 may be configured to apply heat to the thermoplastic resin 50 so as to control a viscoelasticity thereof. To deform the thermoplastic resin 50, the hollow mold 20 or the thermoplastic resin 50 may be selectively heated. To uniformly heat the hollow mold 20 or the thermoplastic resin 50 to the same temperature, it is preferable to heat a surface of the hollow mold 20 with infrared rays from outside or to blow hot air onto the thermoplastic resin 50. For example, when the hollow mold 20 is heated with infrared rays, the heating mechanism 70 may be configured to have an infrared heating apparatus.

To press the thermoplastic resin 50 and the hollow mold 20 against each other uniformly and at the same pressure, the conveyor belt 30 may be made of heat resistant rubber, and force may be applied from the back side of the conveyor belt 30 with the pressure roller 40 enclosing a fluid. The pressure roller 40 may have a structure similar to an automobile tire in which the core is made of high-strength wire, such as a steel cord or a Kevlar cord, surrounded by rubber. The pressure roller 40 provided by such a structure is flexible and capable of bearing high pressure. The pressure roller 40 is used after the enclosing of air or fluid (e.g., water) at high pressure (equivalent to the applied pressure). The pressure inside the pressure roller 40 is equivalent to the pressure required to deform the thermoplastic resin 50 in a rubber elasticity state and is normally about 0.1 MPa to about 0.9 MPa, where the minimum value is 0.1 atmospheres (0.01 MPa) and the maximum value is several atmospheres (several MPa). Depending on the required pressure (P1, P2) in the process, the internal pressure is changed appropriately by a pump, etc.

The conveyor belt 30 may be made of the same material as the pressure roller 40 so that the thermoplastic resin 50 and the hollow mold 20 contact each other with uniform pressure. The conveyor belt 30 has a structure similar to a transmission belt used in automobiles, in which the core is made of high-strength wire, such as a steel cord, glass fiber, or a Kevlar cord, surrounded by heat resistant rubber. The conveyer belt 30 provided by such a structure is flexible and capable of bearing high pressure. The thermoplastic resins 50 may be uniformly supplied to the conveyor belt 30 for the collecting using a vibration conveyor belt, and the thermoplastic resins 50 are prevented from overlapping each other.

Figure 11:
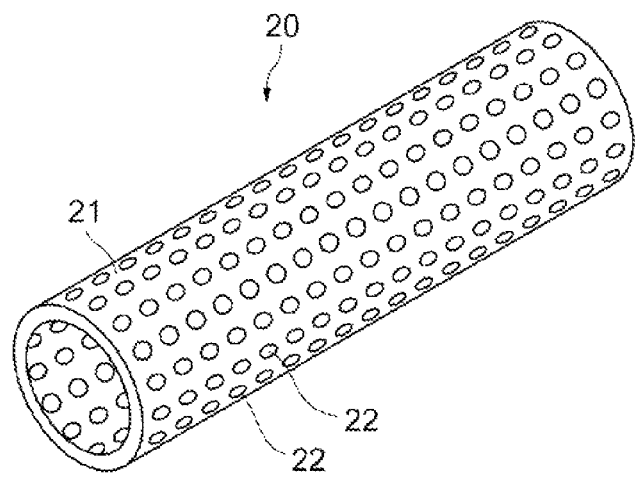
FIG. 11 shows a diagrammatic perspective view of a hollow mold in accordance with an embodiment of the present disclosure.

FIG. 11 shows a diagrammatic perspective view of the hollow mold 20 in accordance with one non-limiting aspect of the present disclosure. The hollow mold 20 is used to deform the thermoplastic resins 50 when collecting the thermoplastic resins 50 based on their rheological characteristics. The hollow mold 20 may be provided with a plurality of holes 22 on its surface 21. The holes 22 with a diameter of approximately 1 mm may be formed in the entire surface 21 of the hollow mold 20. Regardless of the material of the thermoplastic resin 50, the size of the hole 22 may be approximately several tenths of the size of the thermoplastic resin 50. For example, if the size of the thermoplastic resin 50 is from about a few centimeters to about a few millimeters, the size of the hole 22 may be approximately from a few millimeters to a few micrometers, respectively. Adequate fabrication of such holes 22 is possible because deep holes, having a diameter of approximately 1 mm, can be formed by mechanical machining, laser machining, or electrical machining. If the hole 22 is not provided, for example, some thermoplastic resins 50 may not adequately attach to the hollow mold 20 due to differences in surface energy, depending on the type of thermoplastic resins 50. Such a surface energy effect may reduce the accuracy of the collecting based on rheological characteristics. In contrast, if the hole 22 is too large, the thermoplastic resins 50 that are not deformed may enter the hole 22, thus, reducing the collecting accuracy. By providing the hole 22 that is sufficiently small compared with the thermoplastic resins 50, only the surfaces of the thermoplastic resins 50 are deformed and enter the hole 22. By preventing an entire thermoplastic resin 50 from entering the hole 22, accurate collecting based on rheological characteristics can be possible.

To prevent highly adhesive undeformed thermoplastic resins 50 from mistakenly attaching to the hollow mold 20, the surface 21 of the hollow mold 20, excluding the holes 22, may be coated with a low-surface-energy, low-friction, or low-chemical-reactivity substance such as diamond-like carbon, chromium nitride or titanium nitride, which is used for machining tools, resin whose surface is not deformed is prevented from mistakenly attaching to the hollow mold 20, thus increasing accuracy. The hole size of 1 mm is adequate when the size of the thermoplastic resins 50 formed in advance in a crushing step, described later, is several tens of millimeters. The holes 22 may be small enough so that the undeformed thermoplastic resins 50 do not enter the holes 22. The hollow mold 20 may be made of a heat resistant material, such as stainless steel, iron, nickel, chrome, or alloys thereof, or ceramic. Alternatively, the hollow mold 20 may be made of a material whose surface energy is relatively small, such as fluorine resins. Among fluorine resins, there exists a high heat-resistance resin capable of not being decomposed under 300 degrees Celsius. The hollow mold 20 made of such a material whose surface energy is relatively small does not need the low-surface-energy coating.

In addition, by forming the holes 22 penetrating the hollow mold 20, the attached thermoplastic resins 50 can be detached from the inside of the holes 22 by air pressure. In this way, the detachability of the thermoplastic resins 50, which is decreased by having the thermoplastic resins 50 enter the holes 22, can be improved. Accordingly, the thermoplastic resins 50 can be easily detached from the hollow mold 20, and the hollow mold 20 is prevented from clogging which would cause a decrease in the efficiency and accuracy of the process.

Figure 12:
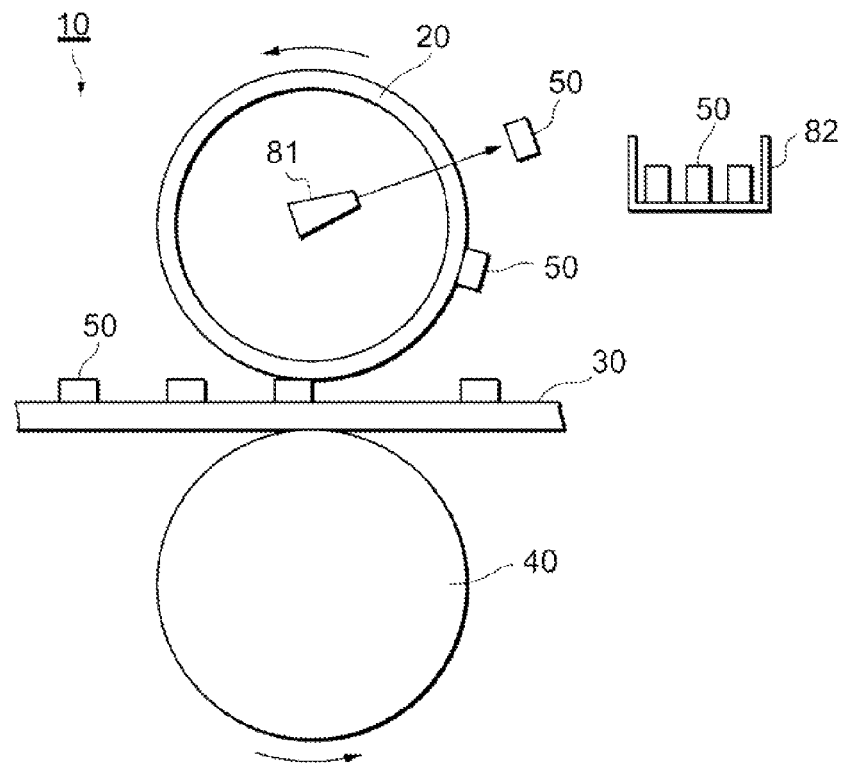
FIG. 12 shows a schematic view of a system for collecting a thermoplastic resin in accordance with an embodiment of the present disclosure.

To facilitate the recovery of the thermoplastic resins 50 attached to the hollow mold 20, in a subsequent step, the holes 22 of approximately 1 mm each penetrating the hollow mold 20 from the outer circumference to the inner circumference are formed such that air, or a fluid such as water, can be injected through the holes 22 from the inside of the hollow mold 20 to remove the thermoplastic resins 50. As shown in FIG. 12, the system 10 may further have an injection mechanism 81 configured to exclude the trapped thermoplastic resin 50 from the hole 22 by injecting fluid from a hollow part of the hollow mold 20. The injection mechanism 81 is configured to inject air (e.g. air jet) or water from the hollow part of the hollow mold 20. Thermoplastic resin 50 can be excluded from the hole 22. The hollow mold 20 can also be cooled. The excluded thermoplastic resins 50 are placed in a collecting container 82.

A device for cutting the thermoplastic resin 50 in advance may be used. For example, a crushing mechanism configured to crush each of the plurality of thermoplastic resins 50 into thermoplastic resin pieces of substantially the same size may be used.

In one non-limiting aspect of the present disclosure, as shown in FIG. 10, the single system 10 may be used for a "batch processing," where remaining thermoplastic resins 50 are stored after each process, and then the temperature and pressure are changed after one process is completed to allow the carrying out of the next process.

Figure 13:
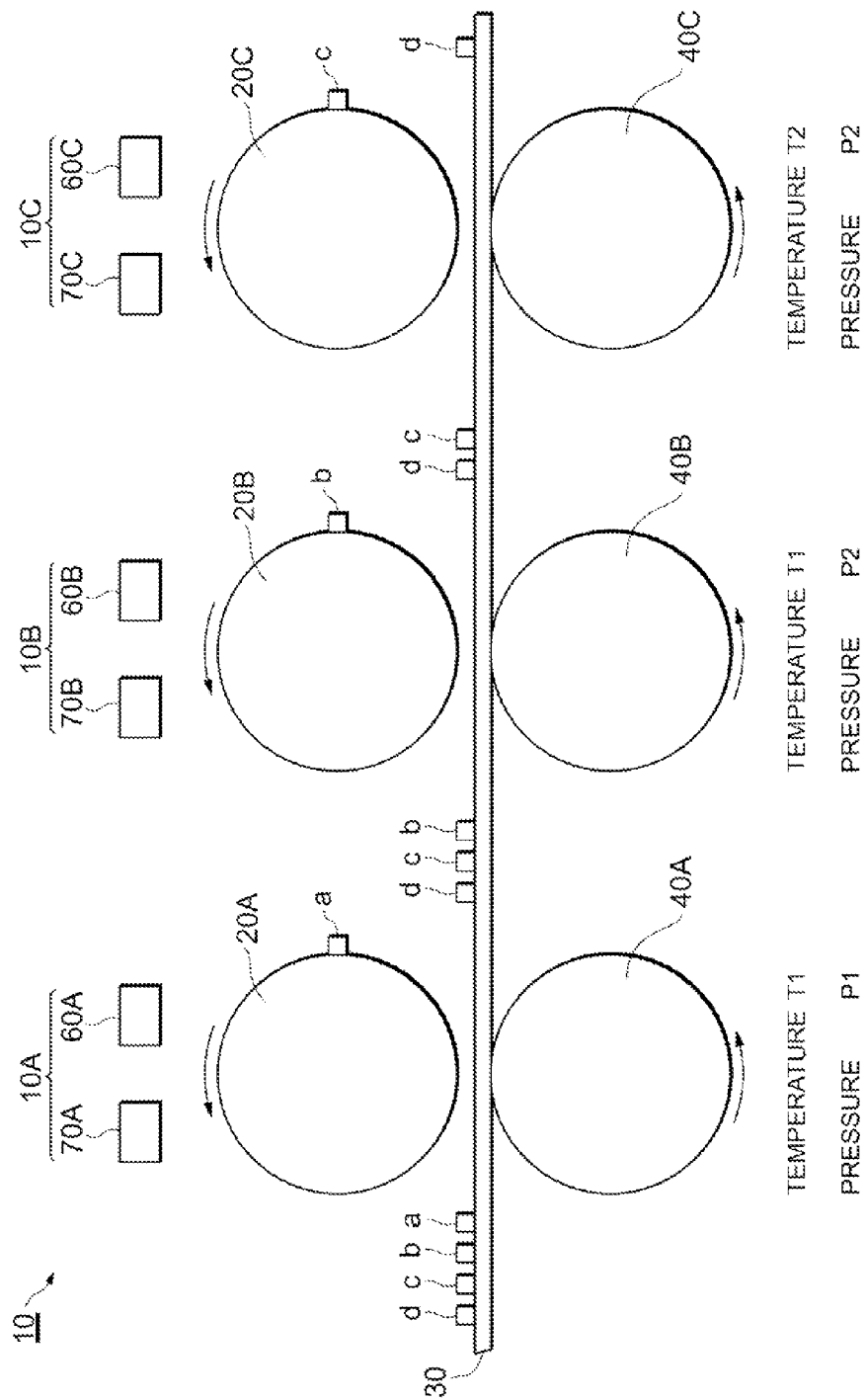
FIG. 13 shows a schematic view of a system for collecting a thermoplastic resin in accordance with an embodiment of the present disclosure.

Alternatively, in another non-limiting aspect of the present disclosure, as shown in FIG. 13, the system 10 may be provided with a plurality of sub-systems 10A, 10B, and 10C connected in cascade form in such a manner that the different sub-systems 10A, 10B, and 10C trap the different thermoplastic resins a, b, and c, having different rheological characteristics from each other.

The sub-system 10A may be provided with a heating mechanism 70A configured to apply heat to the plurality of thermoplastic resins a, b, c, and d so as to control a viscoelasticity thereof, a pressurization mechanism 60A configured to apply a pressure difference to each surface of the plurality of thermoplastic resins a, b, c, and d, and a hollow mold 20A configured to trap a portion of the thermoplastic resin a. The pressurization mechanism 60A may be provided with a pressure roller 40A configured to apply uniform pressure to the thermoplastic resins a, b, c, and d by pressing the hollow mold 20A against the thermoplastic resins a, b, c, and d. An amount of the heat and an amount of the pressure difference applied by the heating mechanism 70A and the pressurization mechanism 60A to the plurality of thermoplastic resins a, b, c, and d are selected so that the thermoplastic resin a is trapped by the hollow mold 20A.

The sub-system 10B may be provided with a heating mechanism 70B configured to apply heat to one or more thermoplastic resins b, c, and d remaining after the thermoplastic resin a is trapped by the hollow mold 20A so as to control a viscoelasticity thereof, a pressurization mechanism 60B configured to apply a pressure difference to each surface of the one or more remaining thermoplastic resins b, c, and d, and a hollow mold 20B configured to trap a portion of the thermoplastic resin b. The pressurization mechanism 60B may be provided with a pressure roller 40B configured to apply uniform pressure to the thermoplastic resins b, c, and d by pressing the hollow mold 20B against the thermoplastic resins b, c, and d. An amount of the heat and an amount of the pressure difference applied by the heating mechanism 70B and the pressurization mechanism 60B to the one or more remaining thermoplastic resins b, c, and d are selected so that the thermoplastic resin b is trapped by the hollow mold 20B.

The sub-system 10C may be provided with a heating mechanism 70C configured to apply heat to one or more thermoplastic resins c and d remaining after the thermoplastic resin b is trapped by the hollow mold 20B so as to control a viscoelasticity thereof, a pressurization mechanism 60C configured to apply a pressure difference to each surface of the one or more remaining thermoplastic resins c and d, and a hollow mold 20C configured to trap a portion of the thermoplastic resin c. The pressurization mechanism 60C may be provided with a pressure roller 40C configured to apply uniform pressure to the thermoplastic resins c and d by pressing the hollow mold 20C against the thermoplastic resins c and d. An amount of the heat and an amount of the pressure difference applied by the heating mechanism 70C and the pressurization mechanism 60C to the one or more remaining thermoplastic resins c and d are selected so that the thermoplastic resin c is trapped by the hollow mold 20C.

The sub-systems 10A, 10B, and 10C may use the mold 23 as shown in FIG. 4 instead of the hollow molds 20A, 20B, and 20C. Also, as shown in FIG. 3, the sub-systems 10A, 10B, and 10C may be provided with the vacuum suction unit 90.

With the present disclosure, thermoplastic resins having similar backbones and similar specific gravity and charging characteristics can be finely collected by heat resistance, and a group of thermoplastic resins having similar heat resistance properties can be even more finely collected by their storage elastic modulus. Such collecting can be performed using the system 10.

Thermoplastic resins that are normally difficult to collect, such as copolymers having different molecular weights and/or contained in different proportions and blended polymers and polymer alloys having different mixing proportions, can be finely collected. Moreover, recycled resins whose quality is uniform and that can be readily reused in products similar to the original products can be provided.

Since collecting is performed by heating the hollow mold 20 and deforming only the surface of the thermoplastic resin, heat affects only the surface of the thermoplastic resin. Thus, compared with a collecting method in which the thermoplastic resins are melted and collected by their melting point, energy consumption is low, and thus costs are low. Degradation of the resin is reduced, and thus, the collected resin can be reused as a high quality resin.

The following are working examples of the present disclosure.

As an example 1, a polystyrene resin, whose glass-transition point is 80 degrees Celsius and whose storage elastic modulus is 0.5 MPa at 100 degrees Celsius, was used as the thermoplastic resin a listed in Table 1. A polyethylene terephthalate resin, whose glass-transition point is 80 degrees Celsius and whose storage elastic modulus is 5 MPa at 100 degrees Celsius, was used as the thermoplastic resin b listed in Table 1. A cycloolefin copolymer resin, whose glass-transition point is 130 degrees Celsius and whose storage elastic modulus is 2 MPa at 150 degrees Celsius, was used as the thermoplastic resin c listed in Table 1. A polycarbonate resin, whose glass-transition point is 160 degrees Celsius and whose storage elastic modulus is 3 MPa at 180 degrees Celsius, was used as the thermoplastic resin d listed in Table 1.

Among a mixture of the thermoplastic resins a, b, c, and d, the thermoplastic resin a was separated from the remaining thermoplastic resins b, c, and d under a pressure of 1 MP at a temperature of 100 degrees Celsius. Then, the thermoplastic resin b was separated from the remaining thermoplastic resins c and d under a pressure of 10 MP at a temperature of 100 degrees Celsius. However, no thermoplastic resin was separated from the remaining thermoplastic resins c and d under a pressure of 1 MP at a temperature of 150 degrees Celsius. Finally, the thermoplastic resin c was separated from the remaining thermoplastic resin d under a pressure of 10 MP at a temperature of 150 degrees Celsius.

As an example 2, an acrylate resin, whose glass-transition point is 100 degrees Celsius and whose storage elastic modulus is 0.1 MPa at 120 degrees Celsius, was used as the thermoplastic resin a listed in Table 1. An acrylate resin, whose glass-transition point is 100 degrees Celsius and whose storage elastic modulus is 2 MPa at 120 degrees Celsius, was used as the thermoplastic resin b listed in Table 1. A cycloolefin copolymer resin, whose glass-transition point is 130 degrees Celsius and whose storage elastic modulus is 1 MPa at 160 degrees Celsius, was used as the thermoplastic resin c listed in Table 1. A thermoplastic polyamide resin, whose glass-transition point is 250 degrees Celsius and whose storage elastic modulus is 5 MPa at 280 degrees Celsius, was used as the thermoplastic resin d listed in Table 1.

Among a mixture of the thermoplastic resins a, b, c, and d, the thermoplastic resin a was separated from the remaining thermoplastic resins b, c, and d under a pressure of 0.2 MP at a temperature of 120 degrees Celsius. Then, the thermoplastic resin b was separated from the remaining thermoplastic resins c and d under a pressure of 5 MP at a temperature of 120 degrees Celsius. However, no thermoplastic resin was separated from the remaining thermoplastic resins c and d under a pressure of 0.2 MP at a temperature of 160 degrees Celsius. Finally, the thermoplastic resin c was separated from the remaining thermoplastic resin d under a pressure of 5 MP at a temperature of 160 degrees Celsius.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claims.

The invention claimed is:

1. A system to collect a thermoplastic resin, the system comprising:
   a heat mechanism comprising an infrared heater or a hot air blower to apply heat to a plurality of thermoplastic resins so as to control a viscoelasticity thereof;
   a pressurization mechanism comprising at least one of a plurality of pressure rollers configured to apply a pressure difference to a surface of the plurality of thermoplastic resins; and
   a trap structure on at least one of a plurality of roller-shaped molds that includes at least one through hole configured to trap a portion of at least one of the plurality of thermoplastic resins,
   wherein the at least one of the plurality of roller-shaped molds that includes at least one through hole, of the trap structure, comprises a surface having the at least one through hole arranged, and
   wherein the pressurization mechanism is configured to apply the pressure difference by pressing the mold against the plurality of thermoplastic resins.

2. The system of claim 1, wherein the amount of heat applied to the plurality of thermoplastic resins is selected based on a softening point of the at least one of the plurality of thermoplastic resins to be trapped.

3. The system of claim 1, wherein the pressure difference applied to the surface of the plurality of thermoplastic resins is selected based on a pressure difference able to distort the at least one of the plurality of thermoplastic resins to be trapped.

4. The system of claim 1, wherein the amount of heat applied to the plurality of thermoplastic resins and the pressure difference applied to the surface of the plurality of thermoplastic resins are selected so that the trapped portion of the at least one of the plurality of thermoplastic resins enters the at least one through hole.

5. The system of claim 1, wherein the mold is made from iron, nickel, chrome, or alloys thereof, or ceramic.

6. The system of claim 1, wherein the low-surface-energy coating is made from diamond-like carbon, chromium nitride, or titanium nitride.

7. The system of claim 1, wherein the at least one of the plurality of roller-shaped molds is a hollow mold.

8. The system of claim 7, further comprising an injection mechanism configured to detach the trapped portion of the at least one of the plurality of thermoplastic resins from the at least one through hole by injection of a fluid from a hollow part of the hollow mold.

9. The system of claim 1, further comprising a crush-mechanism configured to crush each of the plurality of thermoplastic resins into a plurality of thermoplastic resin pieces of substantially same size.

10. The system of claim 1, wherein the heat mechanism is configured to apply the amount of heat to the plurality of thermoplastic resins by heating the trap structure.

11. The system of claim 1, wherein the at least one of the plurality of pressure rollers is configured to apply a uniform pressure to the plurality of thermoplastic resins by pressing the trap structure against the plurality of thermoplastic resins.

12. The system of claim 1, further comprising a conveyor belt configured to convey the plurality of thermoplastic resins.

13. A system to collect a thermoplastic resin, the system comprising:
   a heat mechanism configured to apply an amount of heat to a plurality of thermoplastic resins so as to control a viscoelasticity thereof;
   a trap structure configured to trap a portion of at least one of the plurality of thermoplastic resins, wherein the trap structure comprises a hollow mold having at least one hole that penetrates the hollow mold from a surface thereof and configured to trap the portion of the at least one of the plurality of thermoplastic resins;
   a pressurization mechanism configured to apply a pressure difference to a surface of the plurality of thermoplastic resins, wherein the pressurization mechanism is configured to apply the pressure difference by pressing the mold against the plurality of thermoplastic resins; and
   an injection mechanism configured to detach the trapped portion of the at least one of the plurality of thermoplastic resins from the at least one hole by injection of a fluid from a hollow part of the hollow mold,
   wherein the surface of the hollow mold, except for the at least one hole, is coated with a low surface-energy coating.

14. The system of claim 13, wherein the amount of heat applied to the plurality of thermoplastic resins is selected based on a softening point of the at least one of the plurality of thermoplastic resins to be trapped.

15. The system of claim 13, wherein the pressure difference applied to the surface of the plurality of thermoplastic resins is selected based on a pressure difference able to distort the at least one of the plurality of thermoplastic resins to be trapped.

16. The system of claim 13, wherein the amount of heat applied to the plurality of thermoplastic resins and the pressure difference applied to the surface of the plurality of thermoplastic resins are selected so that the trapped portion of the at least one of the plurality of thermoplastic resins enters the at least one hole.

17. The system of claim 13, wherein the mold is made from iron, nickel, chrome, or alloys thereof, or ceramic.

18. The system of claim 13, further comprising a crush mechanism configured to crush each of the plurality of thermoplastic resins into a plurality of thermoplastic resin pieces of substantially same size.

19. The system of claim 13, wherein the heat mechanism is configured to apply the amount of heat to the plurality of thermoplastic resins by heating the trap structure.

20. The system of claim 13, wherein the pressurization mechanism comprises a pressure roller configured to apply a uniform pressure to the plurality of thermoplastic resins by pressing the trap structure against the plurality of thermoplastic resins.

21. The system of claim 13, further comprising a conveyor belt configured to convey the plurality of thermoplastic resins.

22. A system to collect a thermoplastic resin, the system comprising:
 a heat mechanism configured to apply an amount of heat to a plurality of thermoplastic resins so as to control a viscoelasticity thereof;
 a trap structure comprising a hollow mold having at least one hole that penetrates the hollow mold from a surface thereof and configured to trap a portion of at least one of the plurality of thermoplastic resins; and
 a pressurization mechanism configured to apply a negative pressure to a surface of the plurality of the thermoplastic resins through the at least one hole,
 wherein the surface of the hollow mold, except for the at least one hole, is coated with a low surface-energy coating.

23. The system of claim 22, wherein the amount of heat applied to the plurality of thermoplastic resins is selected based on a softening point of the at least one of the plurality of thermoplastic resins to be trapped.

24. The system of claim 22, wherein the negative pressure applied to the surface of the plurality of the thermoplastic resins is selected based on a negative pressure able to distort the at least one of the plurality of thermoplastic resins to be trapped.

25. The system of claim 22, wherein the amount of heat applied to the plurality of thermoplastic resins and the negative pressure applied to the surface of the plurality of the thermoplastic resins are selected so that the trapped portion of the at least one of the plurality thermoplastic resins enters the at least one hole.

26. The system of claim 22, wherein the mold is made from iron, nickel, chrome, or alloys thereof, or ceramic.

27. The system of claim 22, further comprising a crush mechanism configured to crush each of the plurality of thermoplastic resins into a plurality of thermoplastic resin pieces of substantially same size.

28. The system of claim 22, wherein the heat mechanism is configured to apply the amount of heat to the plurality of thermoplastic resins by heating the trap structure.

29. The system of claim 22, wherein the pressurization mechanism comprises a pressure roller configured to apply a uniform pressure to the plurality of thermoplastic resins by contacting the trap structure with the surface of the plurality of thermoplastic resins.

30. The system of claim 22, further comprising a conveyor belt configured to convey the plurality of thermoplastic resins.

* * * * *